(12) United States Patent
Small et al.

(10) Patent No.: US 9,830,032 B2
(45) Date of Patent: Nov. 28, 2017

(54) ADAPTIVE LOW POWER VCOM MODE

(71) Applicant: SYNAPTICS INCORPORATED, San Jose, CA (US)

(72) Inventors: Jeffrey A. Small, Rochester, NY (US); Imre Knausz, Fairport, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 119 days.

(21) Appl. No.: 14/815,518

(22) Filed: Jul. 31, 2015

(65) Prior Publication Data
US 2017/0031428 A1 Feb. 2, 2017

(51) Int. Cl.
*G06F 3/044* (2006.01)
*G06F 1/32* (2006.01)
*G06F 3/041* (2006.01)
*G09G 3/36* (2006.01)

(52) U.S. Cl.
CPC ............ *G06F 3/044* (2013.01); *G06F 1/3265* (2013.01); *G06F 3/0412* (2013.01); *G09G 3/3655* (2013.01); *G09G 2320/0247* (2013.01); *G09G 2330/021* (2013.01); *Y02B 60/1242* (2013.01)

(58) Field of Classification Search
CPC ........ G09G 3/3696; G09G 2300/0426; G09G 2310/0275; G09G 2320/0257; G09G 2330/022; G09G 2330/027; G09G 2330/028; G09G 2330/04; G09G 5/00; G09G 3/3655; G09G 2320/0247; G09G 2330/021; G06F 1/3265; G06F 1/3262; G06F 1/32; G06F 1/044; G06F 3/0412; Y02B 60/1242
See application file for complete search history.

(56) References Cited

U.S. PATENT DOCUMENTS

| | | | |
|---|---|---|---|
| 7,859,521 B2 | 12/2010 | Hotelling et al. | |
| 8,416,173 B2 | 4/2013 | Ludden | |
| 8,643,624 B2 | 2/2014 | Day et al. | |
| 8,766,950 B1 | 7/2014 | Morein et al. | |
| 9,330,624 B1* | 5/2016 | Pei ........................ | G09G 3/3696 |
| 2003/0025684 A1 | 2/2003 | Chiang et al. | |
| 2008/0303767 A1* | 12/2008 | Ludden ................ | G09G 3/3688 345/89 |
| 2009/0040244 A1* | 2/2009 | Lee ...................... | G09G 3/3696 345/690 |
| 2010/0289734 A1* | 11/2010 | Wu ...................... | G09G 3/3614 345/98 |
| 2011/0025635 A1 | 2/2011 | Lee | |
| 2012/0154322 A1 | 6/2012 | Yang et al. | |
| 2013/0076648 A1 | 3/2013 | Krah et al. | |
| 2013/0082977 A1 | 4/2013 | Noguchi et al. | |

(Continued)

*Primary Examiner* — Md Saiful A Siddiqui
(74) *Attorney, Agent, or Firm* — Patterson + Sheridan, LLP (57) ABSTRACT

Embodiments described herein include a display device having a capacitive sensing device, a processing system and a method for providing an adaptive low-power mode. In one embodiment, the method includes generating a reference voltage with one or more reference voltage generators while a display device is in a grayscale mode. The method also includes driving subpixels in the grayscale mode with the reference voltage. The method further includes shutting down the one or more reference voltage generators and driving subpixels in a low power, binary mode with a VCOM voltage based on positive and negative supply rails.

15 Claims, 5 Drawing Sheets

(56) References Cited

U.S. PATENT DOCUMENTS

| | | |
|---|---|---|
| 2013/0241868 A1 | 9/2013 | Kim et al. |
| 2013/0314342 A1 | 11/2013 | Kim et al. |
| 2014/0146581 A1 | 5/2014 | Tsou et al. |
| 2014/0198138 A1* | 7/2014 | Nambi ............... G09G 3/36 345/690 |
| 2016/0363796 A1* | 12/2016 | Tanaka ............... G02F 1/1368 |

* cited by examiner

ADAPTIVE LOW POWER VCOM MODE

BACKGROUND

Field of the Disclosure

Embodiments of the present invention generally relate to a method and apparatus for touch sensing, and more specifically, to an adaptive power saving mode.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments described herein include a processing system for operating an input device and a method for providing an adaptive low-power mode. In one embodiment, a processing system for operating an input device includes one or more reference voltage generators configured to drive subpixels when a display device is in a grayscale mode. The system includes positive and negative supply rails configured to drive subpixels when the display device is in a low power, binary mode and the reference voltage generators are shut down. The system also includes a VCOM control circuit configured to adjust a VCOM voltage based on the positive and negative supply rails when the reference voltage generators are shut down.

In another embodiment, a processing system for operating an input device includes a VCOM control circuit configured to adjust a VCOM voltage, wherein the VCOM control circuit is further configured to perform a first calibration to determine a first VCOM voltage value for a display device in a grayscale mode and a second calibration to determine a second VCOM voltage value for the display device in a low power, binary mode.

In another embodiment, a method for operating an input device includes generating a reference voltage with one or more reference voltage generators while a display device is in a grayscale mode. The method also includes driving subpixels in the grayscale mode with the reference voltage. The method further includes shutting down the one or more reference voltage generators and driving subpixels in a low power, binary mode with a VCOM voltage based on positive and negative supply rails.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously provide separate VCOM adjustment values for a normal operating mode and a low-power operating mode. Embodiments may also make a VCOM voltage a function of actual values of positive and negative supply rails when in a low-power operating mode.

Figure 1:
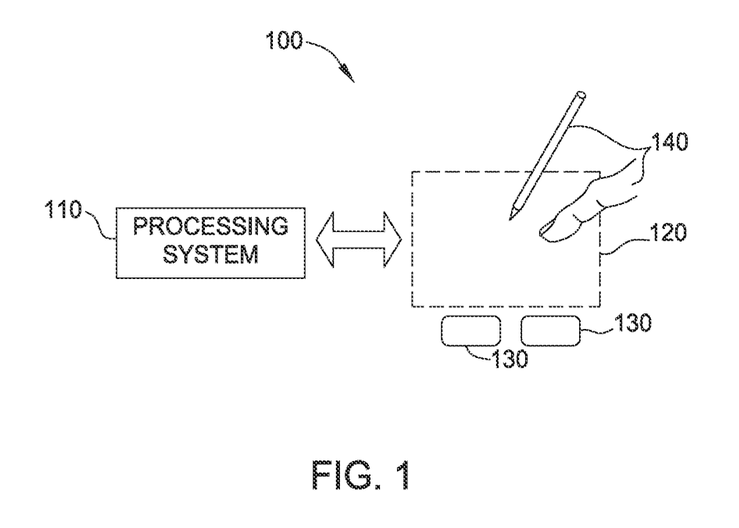
FIG. 1 is a block diagram of a system that includes an input device according to an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
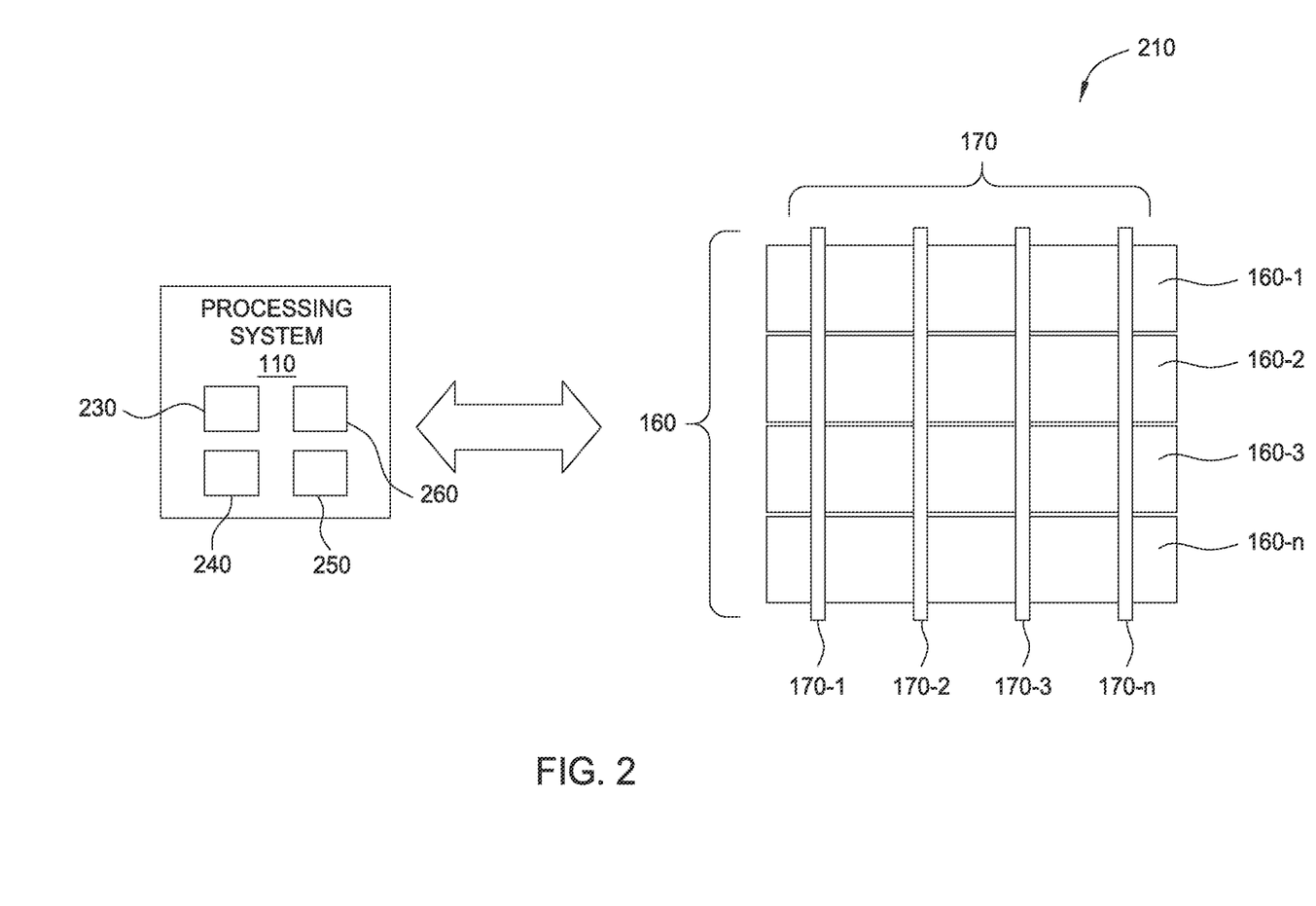
FIG. 2 is an example sensor electrode pattern according to an embodiment.

FIG. 2 illustrates a system 200 including a processing system 110 and a portion of an example sensor electrode pattern configured to sense in a sensing region associated with the pattern, according to some embodiments. For clarity of illustration and description, FIG. 2 shows a pattern of simple rectangles illustrating sensor electrodes, and does not show various components. This sensor electrode pattern comprises a plurality of transmitter electrodes 160 (160-1, 160-2, 160-3, . . . 160-n), and a plurality of receiver electrodes 170 (170-1, 170-2, 170-3, . . . 170-n) disposed over the plurality of transmitter electrodes 160.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, transmitter electrodes 160 comprise one or more common electrodes (e.g., "V-com electrode") used in updating the display of the display screen. These common electrodes may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode 160 comprises one or more common electrodes. In other embodiments, at least two transmitter electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g., combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

Processing system 110 may include a driver module 230, a receiver module 240, a determination module 250, and an optional memory 260. The processing system 110 is coupled to receiver electrodes 170 and transmitter electrodes 160 through a plurality of conductive routing traces (not shown in FIG. 2).

The receiver module 240 is coupled to the plurality of receiver electrodes 170 and configured to receive resulting signals indicative of input (or lack of input) in the sensing region 120 and/or of environmental interference. The receiver module 240 may also be configured to pass the resulting signals to the determination module 250 for determining the presence of an input object and/or to the optional memory 260 for storage. In various embodiments, the IC of the processing system 110 may be coupled to drivers for driving the transmitter electrodes 160. The drivers may be fabricated using thin-film-transistors (TFT) and may comprise switches, combinatorial logic, multiplexers, and other selection and control logic.

The driver module 230, which includes driver circuitry, included in the processing system 110 may be configured for updating images on the display screen of a display device (not shown). For example, the driver circuitry may include display circuitry and/or sensor circuitry configured to apply one or more pixel voltages to the display pixel electrodes through pixel source drivers. The display and/or sensor circuitry may also be configured to apply one or more common drive voltages to the common electrodes to update the display screen. In addition, the processing system 110 is configured to operate the common electrodes as transmitter electrodes for input sensing by driving transmitter signals onto the common electrodes.

The processing system 110 may be implemented with one or more ICs to control the various components in the input device. For example, the functions of the IC of the processing system 110 may be implemented in more than one integrated circuit that can control the display module elements (e.g., common electrodes) and drive transmitter signals and/or receive resulting signals received from the array of sensing elements. In embodiments where there is more than one IC of the processing system 110, communications between separate processing system ICs 110 may be achieved through a synchronization mechanism, which sequences the signals provided to the transmitter electrodes 160. Alternatively the synchronization mechanism may be internal to any one of the ICs.

Figure 3:
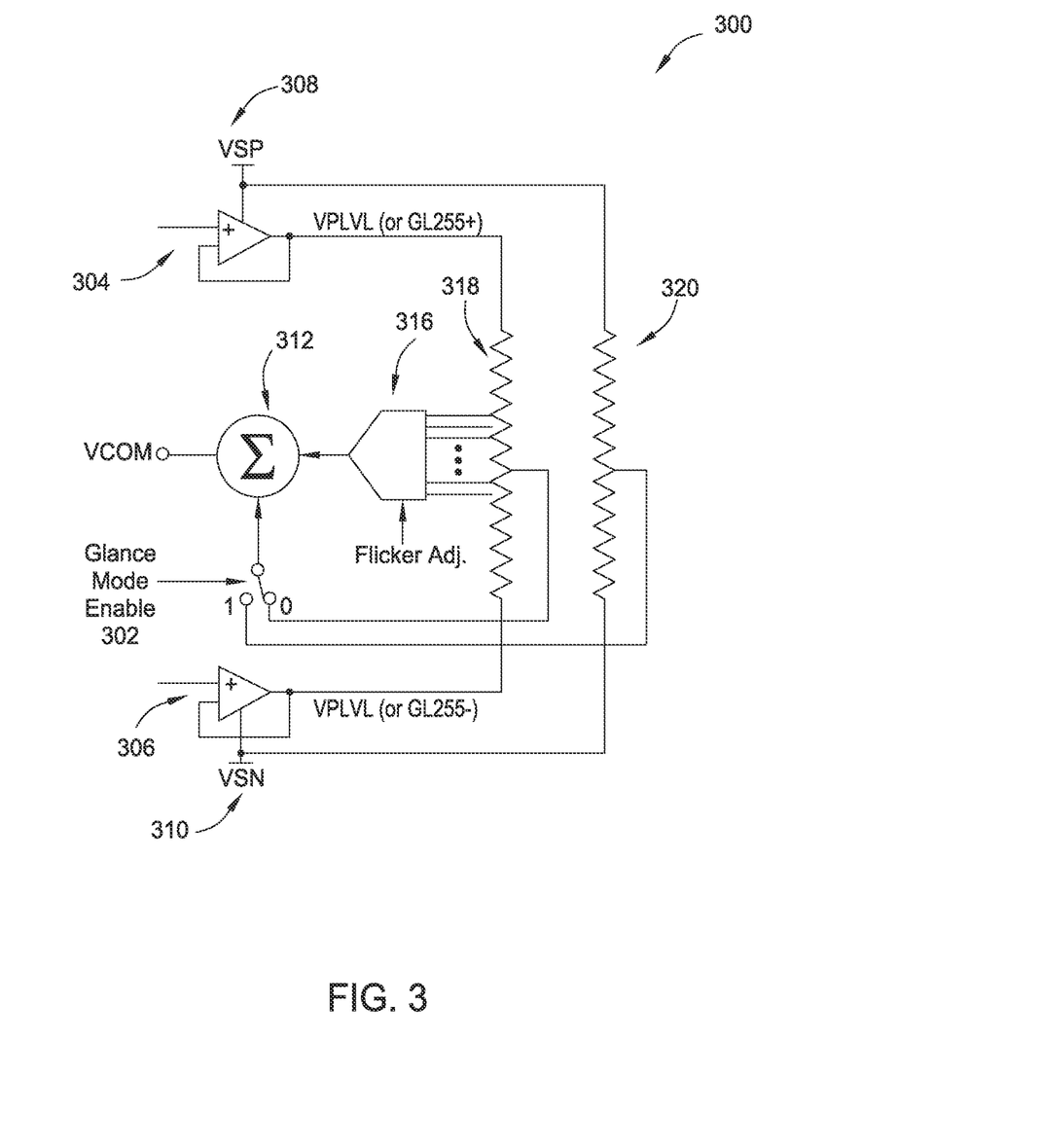
FIG. 3 illustrates an example circuit for an analog compensation method for adjusting a VCOM voltage in a low-power mode.

FIG. 3 illustrates a circuit 300 implementing analog compensation for adjusting a VCOM voltage in a low-power mode, according to an embodiment. Circuit 300 may be implemented in a display associated with a touch input device as described above with respect to FIGS. 1 and 2. Circuit 300 may also be implemented in a display that is not associated with a touch input device in some embodiments. Circuit 300 is a VCOM control circuit configured to adjust a VCOM voltage output from summer 312. In certain low-power display modes, a subpixel is either fully on or fully off; the subpixels do not operate in a grayscale mode. To save power, reference voltage generators can be turned off during these reduced bit-depth display modes. Because reference voltage generators are off, positive and negative supply rails are instead used to drive the subpixels.

During normal display operation, the voltage stored on each subpixel alternates symmetrically between a positive voltage and a negative voltage, so that the average DC voltage value on the subpixel is zero. This average value of zero prevents image flicker and also prevents image sticking due to long-term electro-migration of impurities in the liquid crystal material that would otherwise occur. By adjusting the shapes of positive and negative gamma curves and by also adjusting the DC value of the VCOM voltage, such voltage offsets can be mitigated.

However, in a low-power mode, gamma circuitry may be shut down to save power. The pixel source lines may instead be driven directly from positive and negative supply rails, as noted above. Supply rails are often not well regulated nor independently adjustable. Sometimes they are also supplied from external circuitry. Because the supply rails are not well regulated, a non-zero DC voltage average may appear at the subpixels. This DC voltage can create a residual image that remains on the display. VCOM can be adjusted, as one embodiment shows in FIG. 3, so that it remains centered in the voltage range between the positive and negative supply rails, and so that a net DC voltage of zero appears on the subpixel.

As shown in FIG. 3, a glance mode enable switch 302 switches between a normal operating mode, where reference voltage generators 304 and 306 (source drivers) provide positive and negative voltages, and a "glance" mode, where positive supply rail 308 and negative supply rail 310 provide positive and negative voltages for the circuit. Glance mode refers to a low-power mode of operation (or a reduced bit-depth mode) where reference voltage generators 304 and 306 are shut down to preserve power. Glance mode may comprise a 3-bit color mode, where each color (red, green, blue) is represented by one bit. A frame rate may also be reduced when operating in glance mode to further save power. A similar idea may be applied in other situations, not only low power display modes, that use positive and negative supply rails to provide positive and negative voltages for the circuit.

Flicker adjust digital-to-analog converter (DAC) 316 provides adjustments to VCOM to compensate for parasitic capacitances. One adjustment may be for clock feedthrough. When a clock signal transitions from positive to negative, the clock edge can capacitively couple into the pixel, causing an unwanted average DC offset. Flicker adjust DAC 316 compensates for this feedthrough. Another adjustment may be made for charge injection, caused by a channel charge in a transistor. Charge injection is often small compared to the clock feedthrough and can often be ignored. If charge injection is too big to ignore, the gamma curves may be adjusted making the negative gamma curve different from the positive gamma curve, instead of the curves being symmetrical about a ground voltage.

In circuit 300, in the normal operating mode (glance mode enable switch 302 in the "0" position or off), reference voltage generators 304 and 306 provide positive and negative voltages VPLVL (GL255+) and VNLVL (GL255−), respectively. Tap points on resistor 318 are utilized to add an offset voltage to VCOM, in order to provide a net average DC voltage of zero volts on the subpixel. Resistor 318 can be coupled between reference voltage generators 304 and 306 and can have a plurality of tap points, each tap point providing a different amount of resistance.

In circuit 300, when glance mode is selected by glance mode enable switch 302 (position "1" or on), reference voltage generators 304 and 306 are turned off to save power. A user may select a display mode, or the display mode may be changed based on one or more conditions (such as idle time). Additional circuitry (not shown) is configured to turn on or off the appropriate components in the various display modes. A display driver may enable a power-saving mode as well. Positive supply rail VSP 308 and negative supply rail VSN 310 provide voltages to the subpixels in glance mode. Tap points on resistor 320 add an offset voltage to VCOM by utilizing summer 312, in order to provide a net DC voltage of zero volts on the subpixel in this mode of operation. By providing a net DC voltage of zero, circuit 300 minimizes image sticking and image flicker. Resistor 320 can be coupled between positive supply rail VSP 308 and negative supply rail VSN 310 and can have a plurality of tap points, each tap point providing a different amount of resistance.

Other methods may be used to adjust VCOM for a low-power mode. As a display is manufactured, VCOM is adjusted and flicker is measured at a mid-grayscale level. VCOM is then adjusted until the flicker is minimized, and that VCOM value is stored into a register or profile and used in future operations. A display driver may store the VCOM adjustment value in other embodiments. A similar procedure may be performed during manufacturing to determine a VCOM value for the low-power mode. The value of VCOM for each mode is stored, and the display utilizes the appropriate VCOM value depending on whether the display is in a normal operating mode or a low-power mode. This procedure eliminates the need to derive precise positive and negative drive voltages during low-power mode. However, this procedure depends on repeatable or predictable supply rail voltages in the low-power mode. If the supply rail voltages vary, the stored voltage offset for the low-power mode may not provide the proper offset voltage in all circumstances.

Another method to adjust VCOM comprises monitoring the output voltages of reference voltage generators 304 and 306 with one or more output tracking modules (not shown in FIG. 3) configured to monitor the reference voltage output (or source driver output) when in the grayscale mode. Output tracking modules can also monitor voltages in the low power, binary mode. Then, the VCOM control circuit adjusts the VCOM voltage in response to the source driver output or voltages in either mode. This method can provide an automatic adjustment to the VCOM voltage, which can assist in keeping VCOM at the correct value regardless of temperature, component variations, etc.

Another method to adjust VCOM comprises utilizing the display driver to perform a calibration procedure to determine optimum VCOM voltage values for both the grayscale mode and the low power, binary mode. Optimum values can be stored in the profiles associated with each mode. This calibration procedure can be performed each time a mode is switched, so that an optimum VCOM value can be found even if the voltages on the positive and negative supply rails vary or if the voltages from the source drivers vary.

Figure 4:
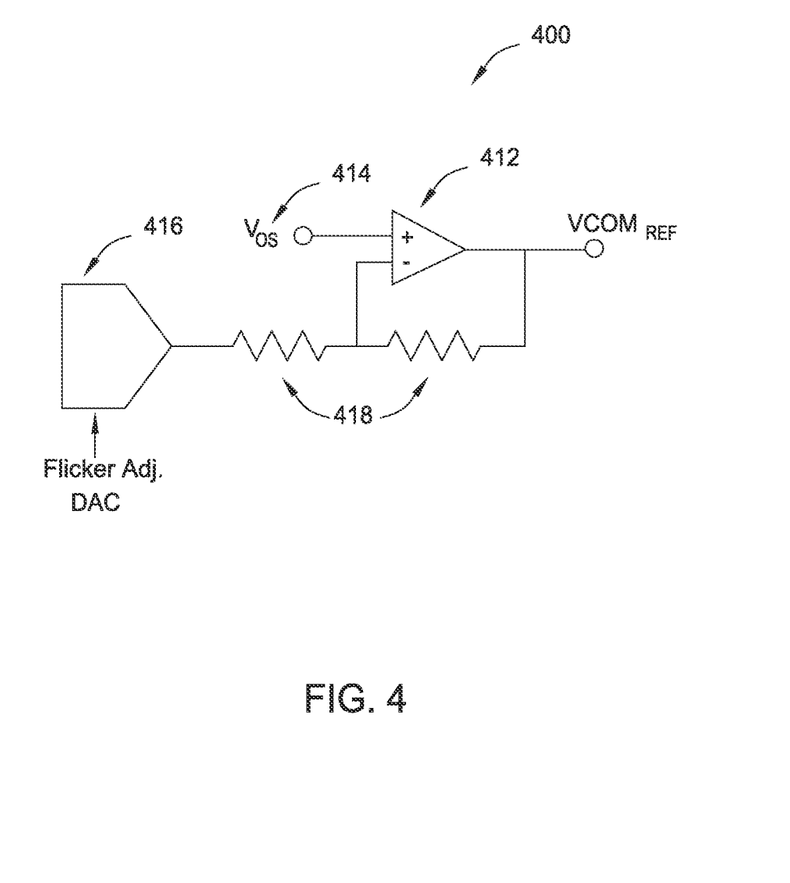
FIG. 4 illustrates an example circuit for flicker adjustment and addition of an offset voltage.

FIG. 4 illustrates another example circuit 400 for flicker adjustment and addition of an offset voltage. Circuit 400 comprises an operational amplifier circuit that introduces a fixed offset voltage $V_{OS}$ 414 to an operational amplifier 412. An op-amp multiplier circuit (comprising op-amp 412 and resistor pair 418) is used to generate the VCOM voltage according to the output of DAC 416 and $V_{OS}$ input 414. The offset voltage $V_{OS}$ 414 can be determined using the methods described above with respect to FIG. 3.

Figure 5:
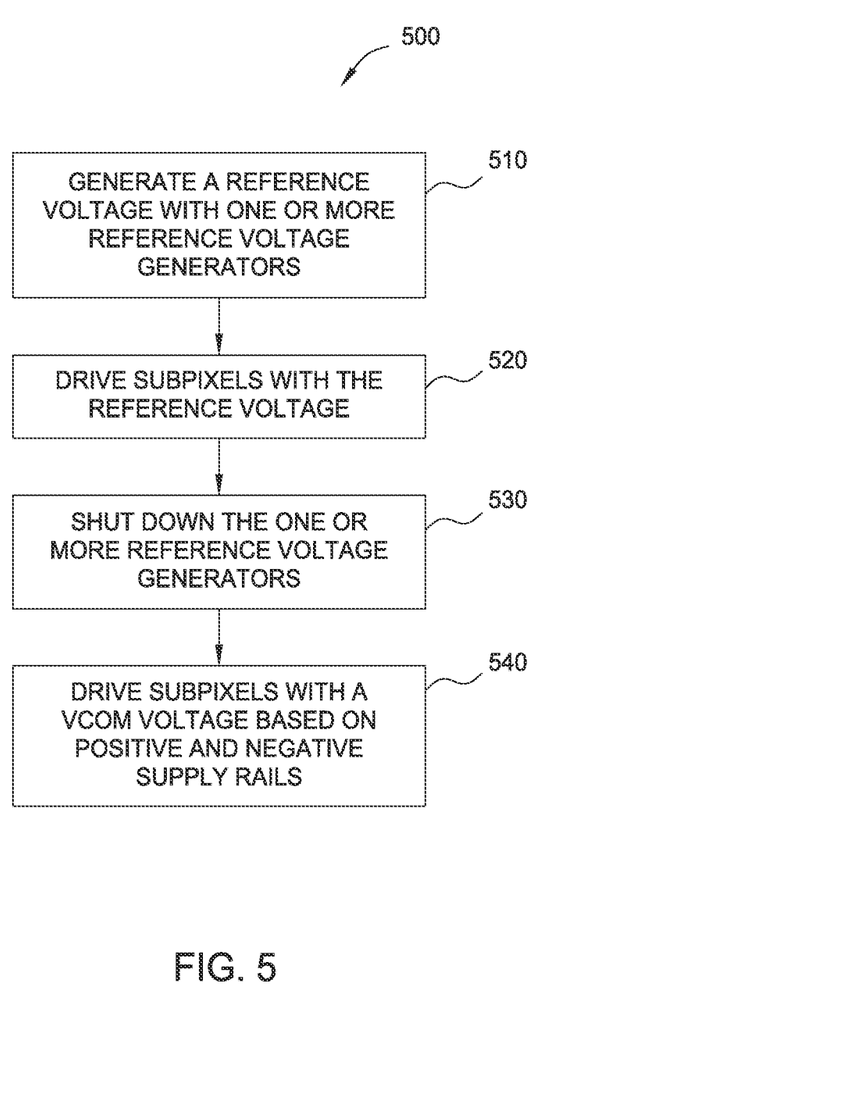
FIG. 5 is a flow diagram illustrating a method for driving subpixels in a low-power mode in accordance with one embodiment.

FIG. 5 is a flow diagram illustrating a method 500 for driving subpixels in a low-power mode in accordance with one embodiment of the invention. The method 500 begins at step 510, where reference voltage generators generate a reference voltage while a display device is in a grayscale mode. In one embodiment, this grayscale is a "normal" operating mode, where full, steady-state power is generated from the reference voltage generators. The method continues at step 520, where the reference voltage drives subpixels in the grayscale mode. The reference voltage generators provide consistent positive and negative voltages in grayscale mode.

At step 530, one or more reference voltage generators are shut down. Reference voltage generators are shut down to reduce power usage in a low-power mode. Power savings are achieved by shutting off the subpixel drive amplifiers that are supplied by the reference voltages. However, voltages from other sources are needed to drive subpixels in the low-power mode. At step 540, the positive and negative supply rails provide a VCOM voltage to drive subpixels in the low-power mode. This VCOM voltage can be adjusted utilizing any of the methods described above to reduce image flicker and image sticking.

In another embodiment, one could keep the reference voltages running and switch them directly to the subpixels according to the binary image data, rather than driving the subpixels through amplifiers. Then, there is no need to adjust VCOM to a different value during glance mode. However, the power savings may be less because even though the amplifiers are turned off, the reference voltage generators are still active.

As noted above, one method for providing a VCOM voltage with the positive and negative supply rails comprises storing an offset voltage in a register or profile for both the normal operating mode and a low-power operating mode. These offset voltages can be determined during manufacturing of the display and stored. Another method for providing a VCOM voltage comprises circuitry to generate the VCOM voltage as a function of the two supply rail voltages plus a fixed offset value.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A processing system for operating an input device, comprising:
   one or more reference voltage generators configured to drive subpixels when a display device is in a grayscale mode;
   positive and negative supply rails configured to drive subpixels when the display device is in a low power, binary mode and the reference voltage generators are shut down, wherein in the low power, binary mode, the subpixels are fully on or fully off,
   a common voltage ("VCOM") control circuit configured to adjust a VCOM voltage value based on the positive and negative supply rails when the reference voltage generators are shut down; and
   a display driver configured to perform a calibration to determine VCOM voltage values for both the grayscale mode and the low power, binary mode, wherein the VCOM control circuit adjusts the VCOM voltage values based on the calibration and drives subpixels using the adjusted VCOM voltage values.

2. The processing system of claim 1, wherein the reference voltage generators are further configured to enter the low-power, binary mode in response to the processing system entering a reduced bit-depth mode.

3. The processing system of claim 1, further comprising:
   an offset circuit configured to select an offset of the VCOM voltage value to reduce undesirable flicker or image sticking effects on the display.

4. The processing system of claim 1, wherein the VCOM control circuit is further configured to adjust the VCOM voltage value by setting the VCOM voltage value to a calculated VCOM voltage value, the calculated VCOM voltage value determined by averaging the positive and negative supply rails and adding an offset voltage.

5. The processing system of claim 4, further comprising:
   performing a calibration to determine the offset voltage;

adjusting the VCOM voltage value to the calculated VCOM voltage value by adding the offset voltage; and
driving subpixels using the adjusted VCOM voltage value.

6. The processing system of claim 1, wherein the VCOM control circuit comprises an operational amplifier circuit.

7. A processing system for operating an input device, comprising:
a common voltage ("VCOM") control circuit configured to: adjust a VCOM voltage value, wherein the VCOM control circuit is further configured to perform a first calibration to determine a first VCOM voltage value for a display device in a grayscale mode and a second calibration to determine a second VCOM voltage value for the display device in a low power, binary mode, wherein in the low power, binary mode, subpixels are fully on or fully off; and
drive the subpixels using the first or the second VCOM voltage value; and
one or more reference voltage generators configured to drive subpixels when the display device is in the grayscale mode, the one or more reference voltage generators configured to shut down when the display device is in the low power, binary mode.

8. The processing system of claim 7, wherein the VCOM control circuit is configured to calibrate the second VCOM value to reduce flicker when one or more reference voltage generators are shut down.

9. The processing system of claim 7, further comprising: positive and negative supply rails configured to drive subpixels in the low power, binary mode.

10. The processing system of claim 7, wherein the VCOM control circuit is further configured to set the second VCOM voltage value to a calculated VCOM voltage value, the calculated VCOM voltage value determined by averaging voltage values of positive and negative supply rails and adding an offset voltage.

11. A method for operating an input device, comprising:
generating a reference voltage with one or more reference voltage generators while a display device is in a grayscale mode;
driving subpixels in the grayscale mode with the reference voltage;
shutting down the one or more reference voltage generators;
driving subpixels in a low power, binary mode with a common voltage("VCOM")based on positive and negative supply rails, wherein in the low power, binary mode, subpixels are fully on or fully off;
restarting the one or more reference voltage generators;
adjusting the VCOM based on the reference voltage generated by the one or more reference voltage generators; and
driving subpixels in the grayscale mode with the reference voltage.

12. The method of claim 11, further comprising:
adjusting the VCOM so that a net DC voltage on each subpixel is zero.

13. The method of claim 11, further comprising:
setting the VCOM to a calculated VCOM, the calculated VCOM determined by averaging voltages of the positive and negative supply rails and adding an offset voltage.

14. The method of claim 11, wherein driving subpixels in the low power, binary mode further comprises reducing a frame rate of the display device.

15. The method of claim 11, further comprising:
determining a presence of an input object in a sensing region in response to touch data.

* * * * *